(12) United States Patent
Thompson et al.

(10) Patent No.: US 7,930,484 B2
(45) Date of Patent: Apr. 19, 2011

(54) SYSTEM FOR RESTRICTED CACHE ACCESS DURING DATA TRANSFERS AND METHOD THEREOF

(75) Inventors: Stephen P. Thompson, Longmont, CO (US); Mark A. Krom, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1182 days.

(21) Appl. No.: 11/052,432

(22) Filed: Feb. 7, 2005

(65) Prior Publication Data

US 2006/0179228 A1   Aug. 10, 2006

(51) Int. Cl.
*G06F 12/14* (2006.01)

(52) U.S. Cl. ........ 711/125; 711/129; 711/134; 711/163; 711/E12.075; 711/E9.033

(58) Field of Classification Search ................... 711/134, 711/133
See application file for complete search history.

(56) References Cited

U.S. PATENT DOCUMENTS

| | | |
|---|---|---|
| 4,181,937 A | 1/1980 | Hattori et al. |
| 4,458,310 A | 7/1984 | Chang |
| 4,464,712 A | 8/1984 | Fletcher |
| 4,513,367 A * | 4/1985 | Chan et al. .................... 711/145 |
| 4,928,239 A | 5/1990 | Baum et al. |
| 5,261,066 A | 11/1993 | Jouppi et al. |
| 5,274,790 A | 12/1993 | Suzuki |
| 5,539,893 A | 7/1996 | Thompson et al. |
| 5,581,725 A | 12/1996 | Nakayama |
| 5,623,627 A | 4/1997 | Witt |
| 5,687,338 A | 11/1997 | Boggs et al. |
| 5,696,947 A * | 12/1997 | Johns et al. .................... 345/537 |
| 5,729,713 A * | 3/1998 | Leyrer ........................... 711/138 |
| 5,752,274 A | 5/1998 | Garibay et al. |
| 5,778,430 A | 7/1998 | Ish et al. |
| 5,787,490 A | 7/1998 | Ozawa |
| 5,809,271 A | 9/1998 | Colwell et al. |
| 5,870,599 A | 2/1999 | Hinton et al. |
| 6,078,992 A | 6/2000 | Hum |
| 6,105,111 A | 8/2000 | Hammarlund et al. |

(Continued)

FOREIGN PATENT DOCUMENTS

EP  0250702 A2 *  1/1988

(Continued)

OTHER PUBLICATIONS

Intel Architecture Software Developers Manual vol. 1: Basic Architecture, 1997, Intel Corporation, p. 6-34 to 6-36.*

(Continued)

*Primary Examiner* — Mardochee Chery

(57) ABSTRACT

Instructions involving a relatively significant data transfer or a particular type of data transfer via a cache result in the application of a restricted access policy to control access to one or more partitions of the cache so as to reduce or prevent the overwriting of data that is expected to be subsequently used by the cache or by a processor. A processor or other system component may assert a signal which is utilized to select between one or more access policies and the selected access policy then may be applied to control access to one or more ways of the cache during the data transfer operation associated with the instruction. The access policy typically represents an access restriction to particular cache partitions, such as a restriction to one or more particular cache ways or one or more particular cache lines.

16 Claims, 4 Drawing Sheets

U.S. PATENT DOCUMENTS

| | | | |
|---|---|---|---|
| 6,151,662 | A | 11/2000 | Christie et al. |
| 6,216,206 | B1 | 4/2001 | Peled et al. |
| 6,223,256 | B1* | 4/2001 | Gaither .................... 711/134 |
| 6,349,365 | B1* | 2/2002 | McBride .................... 711/133 |
| 6,370,618 | B1 | 4/2002 | Arimilli et al. |
| 6,370,622 | B1* | 4/2002 | Chiou et al. ................ 711/146 |
| 6,385,695 | B1 | 5/2002 | Arimilli et al. |
| 6,397,296 | B1 | 5/2002 | Werner |
| 6,434,669 | B1 | 8/2002 | Arimilli et al. |
| 6,591,347 | B2* | 7/2003 | Tischler et al. ............. 711/134 |
| 6,725,337 | B1* | 4/2004 | Tan et al. ................... 711/133 |
| 6,728,835 | B1 | 4/2004 | Bauman et al. |
| 6,772,291 | B2* | 8/2004 | Palanca et al. .............. 711/128 |
| 6,845,432 | B2 | 1/2005 | Maiyuran et al. |
| 6,901,477 | B2 | 5/2005 | Sullivan |
| 7,099,998 | B1 | 8/2006 | Berkovits |
| 7,103,721 | B2 | 9/2006 | Cargnoni et al. |
| 7,392,340 | B1 | 6/2008 | Dang et al. |
| 2002/0013887 | A1 | 1/2002 | Ting |
| 2003/0140195 | A1 | 7/2003 | Borkenhagen et al. |
| 2004/0015660 | A1* | 1/2004 | Benveniste et al. .......... 711/134 |
| 2004/0078524 | A1* | 4/2004 | Robinson ................... 711/133 |
| 2004/0098541 | A1* | 5/2004 | Megiddo et al. ............. 711/129 |
| 2004/0215890 | A1 | 10/2004 | Cargnoni et al. |
| 2004/0268099 | A1 | 12/2004 | Smith et al. |
| 2005/0091457 | A1 | 4/2005 | Auld et al. |
| 2005/0188158 | A1* | 8/2005 | Schubert .................... 711/133 |
| 2005/0235114 | A1 | 10/2005 | Megiddo et al. |

FOREIGN PATENT DOCUMENTS

| | | |
|---|---|---|
| EP | 0405318 A2 | 1/1991 |
| EP | 0779581 A2 | 6/1997 |
| JP | 62099845 | 5/1987 |

OTHER PUBLICATIONS

"Set associative cache," printed from URL <<http://www.cacs.louisiana.edu/~mgr/404/burks/foldoc/92/104.htm>> on May 14, 2007, 1 page.*

"Cache Mapping and Associativity," printed from URL http://www.pcguide.com/ref/mbsys/cache/funcMapping-c.html on May 14, 2007, 2 pages, updated Apr. 17, 2001.*

"REP/REPE/REPZ/REPNE/REPNZ—Repeat Following String Operation," 80386 Programmer's Reference Manual—Opcode REP, 2 pgs, downloaded from URL <<" http://i386.cybersabotage.com/rep/html">> on Dec. 9, 2004.

IBM Corp., "Realizing An L2 As An Extension of An L1"; IBM Technical Disclosure Bulletin, IBM Corp. New York, US; vol. 36, No. 12; Dec. 1, 1993; pp. 143-144.

Jouppi et al., "Improving Direct-Mapped Cache Performance by the Addition of a Small Fully-Associative Cache and Prefetch Buffers," Proc. 17th International Symposium Computer Architecture, May 1990, pp. 364-373.

Stiliadis et al., "Selective Victim Caching: A Method to Improve the Performance of Direct-Mapped Caches," IEEE Transactions on Computers, vol. 46, No. 5, May 1997, pp. 603-610.

John et al., "Design and Performance Evaluation of a Cache Assist to Implement Selective Caching," 1997 IEEE International Conference on Computer Design: VLSI in Computers and Processors, 1997, ICCD '97 Proceedings, Oct. 12-18, 1997, pp. 510-518.

"6.5 Cache Architecture," printed from URL <<http://webster.cs.ucr.edu/AoA/Windows/HTML/MemoryArchitecturea2.html>> on Nov. 27, 2006, 6 pages.

Actions on the Merits by the U.S.P.T.O. as of Sep. 21, 2007, 2 pages.

U.S. Appl. No. 10/052,650, Office Action mailed Nov. 9, 2006.

U.S. Appl. No. 10/052,650, Office Action mailed Feb. 8, 2007.

U.S. Appl. No. 10/052,650, Office Action mailed Jul. 24, 2007.

U.S. Appl. No. 11/509,178, Office Action mailed Jul. 29, 2008.

U.S. Appl. No. 11/509,178, Final Office Action mailed Dec. 9, 2008.

U.S. Appl. No. 11/509,178, Office Action mailed May 12, 2009.

Actions on the Merits by the U.S.P.T.O. as of Jan. 2, 2009, 2 pages.

* cited by examiner

SYSTEM FOR RESTRICTED CACHE ACCESS DURING DATA TRANSFERS AND METHOD THEREOF

CROSS-REFERENCE TO RELATED APPLICATIONS

The present application is related to U.S. patent application Ser. No. 11/052,650 entitled "SYSTEM HAVING CACHE MEMORY AND METHOD OF ACCESSING" and filed on Feb. 7, 2005, the entirety of which is incorporated by reference herein.

FIELD OF THE DISCLOSURE

The present disclosure is related generally to caching in processing systems and more specifically to restricting access to cache during data transfers.

BACKGROUND

Cache memories often are utilized in processing systems to store information such as data or instructions to be utilized by a processor or to be subsequently stored in more permanent memory, such as system memory or a hard disk. To illustrate, in personal computing systems, graphics drivers often utilize caches to move large blocks of video data between system memory and one or more video frame buffers. To implement such a transfer, the graphics driver may employ a tight loop or an x86 REP command to repeatedly implement a move function to sequentially transfer the block of data from memory to the frame buffer, or vice versa, via a cache. However, such a technique typically has the effect that data in the cache is overwritten by the video data being transferred. It will be appreciated that overwriting data already in the cache may reduce cache efficiency as the overwritten data may need to be reinserted into the cache subsequent to the transfer of the video data out of the cache, and this reinsertion of data often results in a significant delay or a stalling of the processor. Accordingly, a technique to prevent or reduce the overwriting of frequently used data in a cache during data transfers would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DRAWINGS

FIGS. 1-8 illustrate exemplary systems and techniques whereby cache access may be controlled during a transfer of data via the cache. In at least one embodiment, instructions related to non-data transfer operations or to operations involving relatively small data transfers via the cache, result in the application of a first access control policy to control access to one or more partitions of a cache during the use of the cache by a processor. In contrast, for instructions involving a relatively significant data transfer or a particular type of data transfer, result in the application of a second access policy to control access to one or more partitions of the cache so as to reduce or prevent the overwriting of data that is expected to be subsequently used by the cache or by a processor. As described in greater detail herein, the type or magnitude of the data transfer associated with a particular operation may be determined based upon an inspection or comparison of a prefix field and/or an opcode field of the instruction. In response to this comparison or inspection, a processor or other system component may assert a signal which is utilized to select between one or more access policies and the selected access policy then may be applied to control access to one or more ways of the cache during the data transfer operation associated with the instruction. The access policy typically represents an access restriction to particular cache partitions, such as a restriction to one or more particular cache ways or one or more particular cache lines. The access policy related to an access restriction to particular cache ways may be represented by, for example a cache mask. The restriction to particular cache partitions may be selected using, for example, least recently used (LRU) information maintained for the cache.

Figure 1:
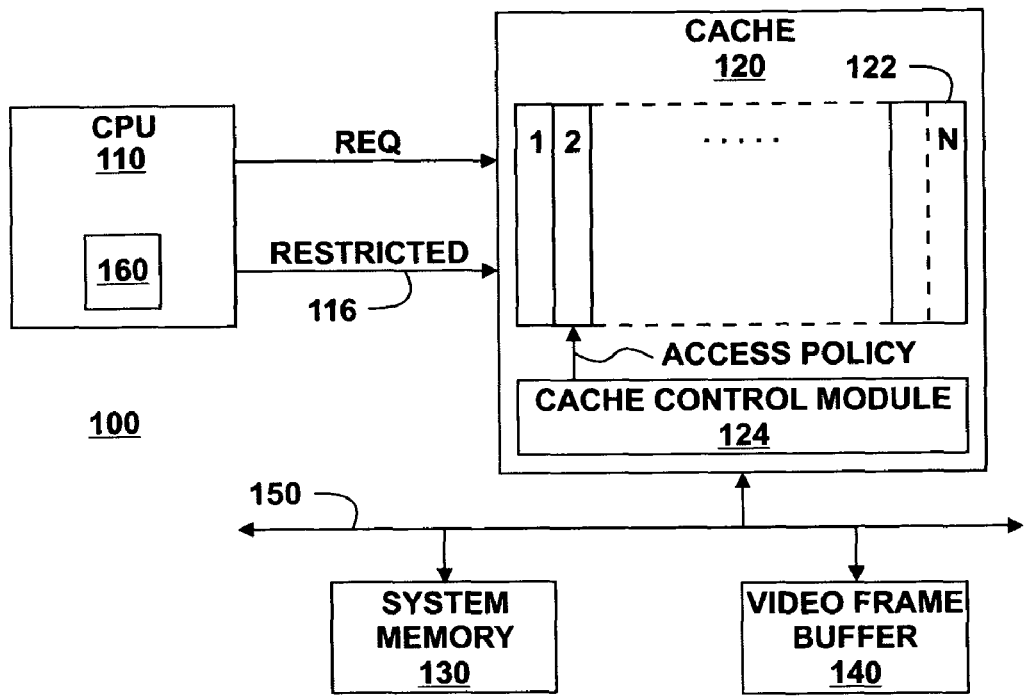
FIG. 1 is a block diagram illustrating an exemplary processing system in accordance with at least one embodiment of the present disclosure.

Referring now to FIG. 1, an exemplary system 100 that utilizes an exemplary cache control mechanism is illustrated in accordance with at least one embodiment of the present disclosure. The system 100 includes a processor 110, such as a central processing unit (CPU), a cache 120, which as illustrated, includes a cache memory 122 having a plurality of ways (denoted as ways 1–N) for each of a plurality of cache rows, and a cache control module 124 (e.g., a software, hardware or firmware module). As used herein, the term cache row refers to a set of cache lines associated with a common index. The cache memory 120 may comprise, for example, a 16-way, 128-row cache with each cache line capable of storing 32 bytes of data. The system 100 further may comprise one or more modules that utilize the cache 120, such as system memory 130 and display frame buffer 140 coupled to the cache 120 and/or the processor 110 via, for example, a system bus 150.

In at least one embodiment, the cache 120 is utilized to store data for use by the processor 110 or utilized to facilitate the transfer of data between, for example, the system memory 130 and the display frame buffer 140. As will be appreciated, such transfers typically are initiated by the processor 110 prior to or during the execution of one or more instructions by the processor 110. As noted above, the storage for data for use by the processor 110 or the transfer of data may result in the overwriting of data already present in the cache memory 122. Being overwritten, this data consequently is unavailable for use by the processor 110 during subsequent operations, and therefore the overwriting of this data may hinder the efficiency of the processor 110 as well as the cache 120. Accordingly, in at least one embodiment, the cache control module 124 may implement a cache access control policy that restricts access to one or more portions (e.g., one or more ways or one or more cache blocks) of the cache memory 122 during certain types of data transfers and data storages in the cache memory 122. This access control policy may identify a subset of the plurality of ways or cache blocks that contain data expected to be used by the processor 110 subsequent to the data transfer or data storage operation, as well as those ways/cache blocks of the cache memory 122 that may contain data that is not expected to hold or store data to be utilized by the processor 110 subsequent to the data transfer. The access control policy therefore may identify those ways/cache blocks which may be utilized during the data transfer operation without substantially impeding the efficiency of the data processor 110 in its use of the cache 120. As discussed in detail herein, the access control policy may be implemented by one or more sets of cache masks that indicate those ways of the cache memory 122 which may be used to store data during a data transfer operation, as well as those ways which are prohibited from being used during a data transfer operation.

The particular access policy utilized during a data transfer operation, in one embodiment, is selected based on a restricted identifier signal 116 provided or asserted by the processor 110 in response to, or in preparation of, an execution of a particular data transfer operation. Based on the signal 116 asserted or provided by the processor 110, the cache control module 124 selects an access policy to apply to the cache memory 122 so as to limit or prevent access to one or more ways of the cache memory 122.

The processor 110 may utilize an instruction analysis module 160 (e.g., a software, hardware or firmware module) to analyze instructions to be executed or currently executed by the processor 110 so as to determine whether to assert the signal 116. In one embodiment, the module 160 determines whether to assert the restricted identifier signal 116 based on a determination that an instruction to be executed is identified as a particular type of instruction associated with the transfer of transient data or large blocks of data, such as video data. Based on this identification, the module 160 may operate the processor 110 so as to assert the restriction signal 116 or directly assert the signal 116.

In one embodiment, particular instructions associated with large data transfers or data transfers of relatively transient data are identified based upon at least one of a prefix field or an opcode field of the instruction currently executed or to be executed.

To illustrate, the REP instruction (prefix 0xF3 in the x86 architecture) is commonly used in the x86 processing architecture to repeat certain instructions such as the move string (MOVS) instruction (opcode 0xA4 or 0xA5 in the x86 architecture, depending upon operand size). Accordingly, the module 160 may analyze an instruction to be executed by the processor 110 to determine whether the prefix field of the instruction to be executed substantially matches the prefix field associated with the REP instruction. Further, the module 160 may also scrutinize the opcode field to be executed to determine whether it substantially matches the opcode value associated with the move string instruction. Should one or both of the fields of the instruction to be executed match the fields of a REP MOVS instruction, the module 160 may cause the restriction signal 116 to be asserted. However, it will be appreciated that in some instances, the REP MOVS instruction may be utilized in operations that do not utilize relatively large blocks of data or do not transfer transient data. Accordingly, in at least one embodiment, the REPNE instruction (prefix 0xF2 in the x86 architecture) may be utilized to identify data transfer operations that are to have restricted cache access. To illustrate, a particular instruction typically not utilized, such as the REPNE MOVS command may be utilized to particularly identify a data transfer operation that involves large blocks of data or relatively transient data via the cache 120. In this embodiment, the module 160 may scrutinize operations to be executed by the processor 110 to identify those that utilize the particular operation (e.g., the REPNE MOVS operation). Based on the identification of this unique operation, the module 160 may cause the restricted identifier signal 116 to be asserted.

Figure 2:
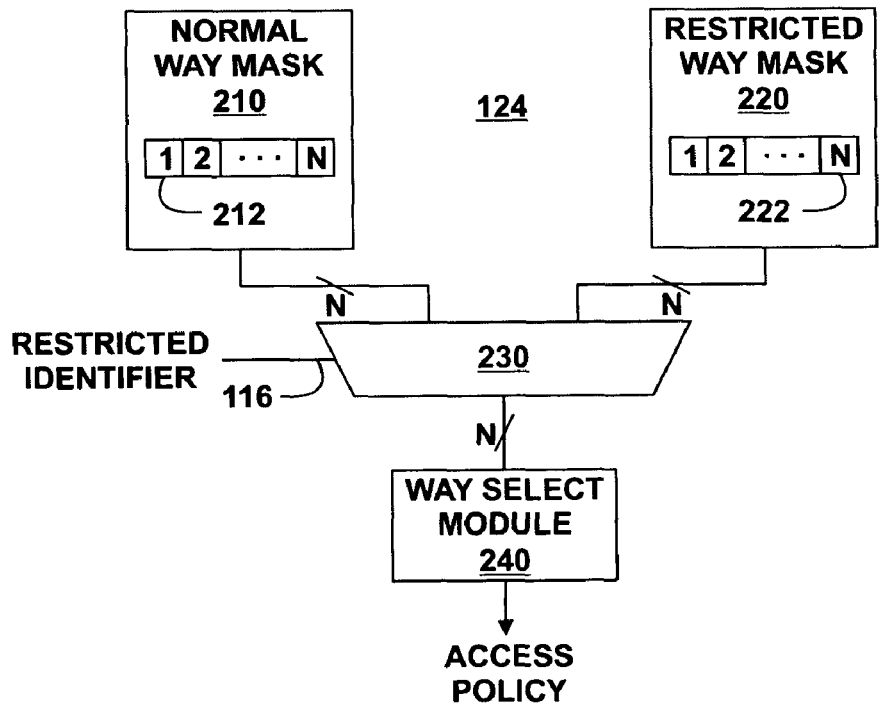
FIGS. 2, 5 and 7 are block diagrams illustrating exemplary cache control modules in accordance with at least one embodiment of the present disclosure.

Referring now to FIG. 2, an exemplary implementation of the cache control module 124 is illustrated in accordance with at least one embodiment of the present disclosure. As depicted, the cache control module 124 may comprise a normal way mask module having one or more cache masks 212, a restricted way mask module 220 (e.g., a software, hardware or firmware module) having one or more cache masks 222, a multiplexer 230 having as inputs the output from the normal way mask module 210 and the output of the restricted way mask module 220 and having as a select input the restricted signal 116, which may be provided by the processor 110. The multiplexer 230 selects as its output one of the cache masks 212 from the normal way mask, or one of the cache masks 222 from the restricted way mask module 220 based upon the value of the signal 116. In the event that the instruction to be executed by the processor 110 is not identified as an instruction involving the transfer of a large block of data or the transfer of transient data, the signal 116 may be de-asserted, thereby resulting in the provision of a cache mask 212 from the normal way mask module 210 (e.g., a software, hardware or firmware module) at the output of the multiplexer 230. In contrast, an instruction to be executed by the processor 110 that is identified as involving the transfer of a large block of data or the transfer of transient data may result in the processor 110 asserting the signal 116, which in tern results in the output of one or more cache masks 222 at the output of the multiplexer 230.

The way select module 240 receives the one or more cache masks output by the multiplexer 230 and applies them as the access policy of the cache memory 122 so as to restrict access to one or more ways of the cache memory 122 during the execution of the instruction at the processor 110. As illustrated, the cache module 212 and 222 may comprise a plurality of fields where each field corresponds to one of the plurality of ways of the cache memory 122, and wherein access to a particular way of the cache memory 222 is controlled based on the value (i.e., 0 or 1) stored at the field of the cache mask associated with a particular way. Alternatively, the cache masks 212 or 222, may comprise a plurality of fields, each field associated with a particular cache line, wherein the value stored in each field of the prior fields controls access to the corresponding cache line.

In at least one embodiment, the cache mask 212 implemented during operations that do not involve the transfer of large blocks of data or the transfer of transient data typically are less restrictive than the cache mask 222 implemented during operations involving the transfer of transient data or large blocks of data, so as to prevent or limit the amount of overwriting of valid data which is expected to be used by the processor 110 subsequent to the data transfer operation. The particular access control policy to be implemented using the cache mask 212 or cache mask 222 may be predetermined or may be constructed or modified on the fly by, for example, an operating system executed by the processor 110 or other processing device.

To illustrate, the operating system or other component of the cache 120 may monitor the cache memory 122 to determine or identify those portions of the cache which have been either most recently used, least recently used, or having some other appropriate performance parameter. Using this information, the operating system may set one or both of the cache masks 212 or 222 so as to protect those ways identified as being frequently used or most recently used, while allowing access to those ways identified as being the least frequently used or used last. Other considerations, such as the amount of valid data stored in a particular way, further may be utilized to determine whether or not access to a particular way should be granted in a particular access control policy. Although an exemplary implementation of a control access policy utilizing cache masks is illustrated, those skilled in the art may, using the guidelines provided herein, implement cache access policies utilizing other techniques without departing from the spirit or the scope of the present disclosure.

The way select module 240, in one embodiment, receives the cache mask output by the multiplexer 230 and implements the access control policy represented by the output cache mask. In one embodiment, the cache way mask contains a bit for each way of the cache. If a bit is asserted in the mask, then the corresponding way will not be replaced by the data being accessed. The cache controller will instead select a way to be overwritten with the new data among the ways having deasserted mask bits using conventional cache replacement policies (e.g., least-recently-used way or an unused way).

Figure 3:
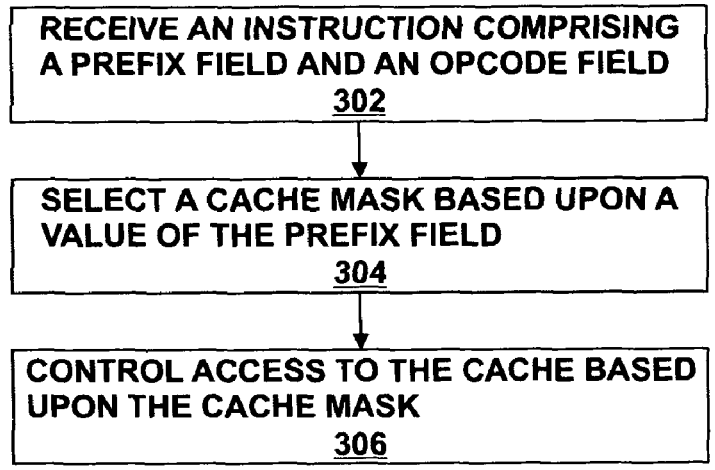
FIGS. 3, 4, 6 and 8 are flow diagrams illustrating exemplary cache access control methods in accordance with at least one embodiment of the present disclosure.

Referring now to FIG. 3, an exemplary method 300 for controlling access to a cache is illustrated in accordance with at least one embodiment of the present disclosure. The method 300 initiates at step 302 wherein an instruction comprising a prefix field and an opcode field is received. At step 304, a cache mask is selected based on a value of the prefix field. Selecting the cache mask may include selecting a first cache mask when the prefix field matches a first predefined value and selecting a second cache mask when the prefix field matches a second predefined value. At step 306, access to a cache is controlled based on the selected cache mask. The opcode field may represent a data transfer instruction, such as the MOVS instruction, and the prefix field may represent a repeat-type instruction, such as REP, REPE, or REPNE. Access to the cache may be restricted by tag, way or a combination thereof.

Figure 4:
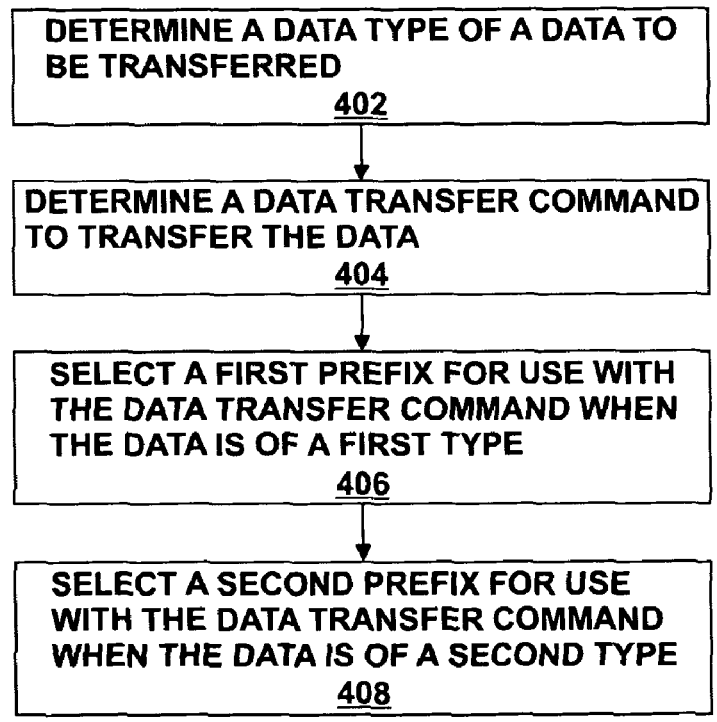

Referring now to FIG. 4, another exemplary method 400 for controlling access to a cache is illustrated in accordance with at least one embodiment of the present disclosure. The method 400 initiates at step 402 wherein a data type of data to be transferred is determined. At step 404, a data transfer operation to transfer the data is determined. At step 406, a first prefix for use with the data transfer operation is selected when the data is of a first type. At step 408, a second prefix for use with the data transfer operation is selected when the data is of a second type. In one embodiment, the data of a first type is video data and data of the second type is different than the data of the first type. In another embodiment, the data of a first type is data to be transferred to a video frame buffer or the data of a first type is transient data is not subject to reuse. The first prefix may be selected to facilitate selection of a first cache mask and the second prefix is selected to facilitate selection of a second cache mask.

Figure 5:
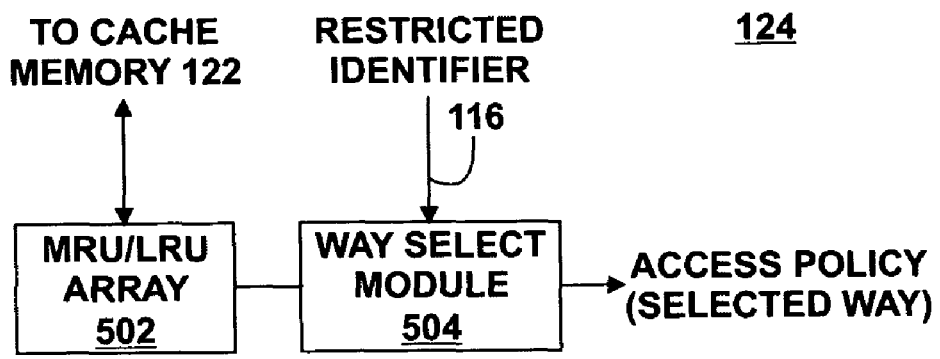
Figure 6:
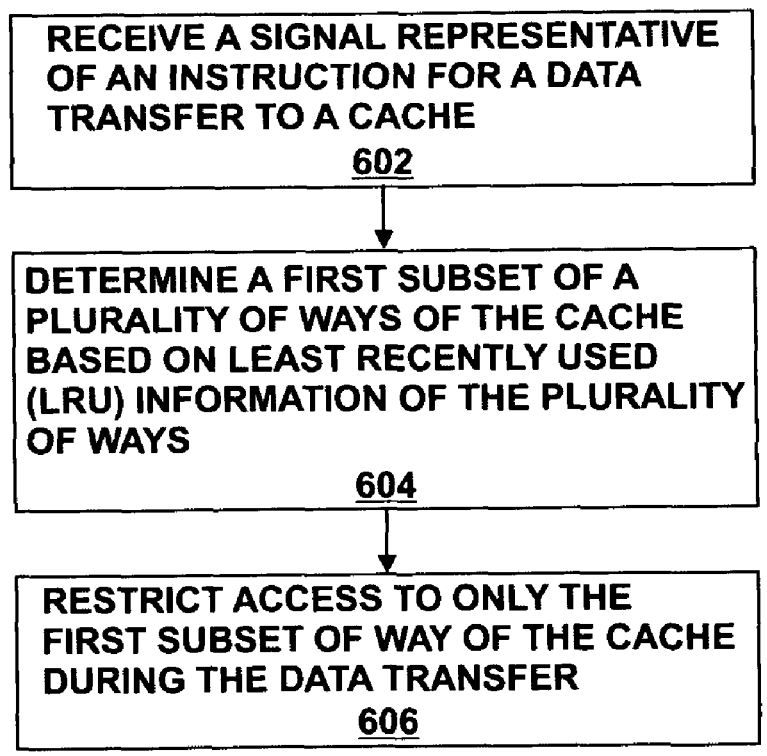

Referring now to FIGS. 5 and 6, another exemplary implementation of the cache control module 124 is illustrated in accordance with at least one embodiment of the present disclosure. In the illustrated example of FIG. 5, the cache control module 124 comprises a most recently used (MRU)/least recently used (LRU) array 502 connected to a way select module 504. The MRU/LRU array 502 is used to maintain LRU and/or MRU information for the cache ways, cache rows and/or cache lines (or any other type of cache partition). The way select module 504, in response to receipt of the restricted identifier signal 116, in turn, may utilize the MRU/LRU array 502 to identify one or more of the ways of the cache memory 122 (FIG. 1) that have the least recently used data (and therefore the least likely to be accessed by the processor 110). The way select module 504 then may implement an access policy for the cache memory 122 whereby the data transfer operation that triggered the assertion of the signal 116 is restricted to only those one or more ways of the cache memory as having the least recently used data.

The method 600 of FIG. 6 illustrates an exemplary operation using the control module 124 as illustrated in FIG. 5. The method 600 initiates at step 602 wherein a signal representative of an instruction for a data transfer to a cache (e.g., signal 116) is received. At step 604, a first subset of the plurality of ways of the cache based on least recently used (LRU) information of the plurality of ways is determined. At step 606, access is restricted to only the first subset of ways of the cache during the data transfer.

Figure 7:
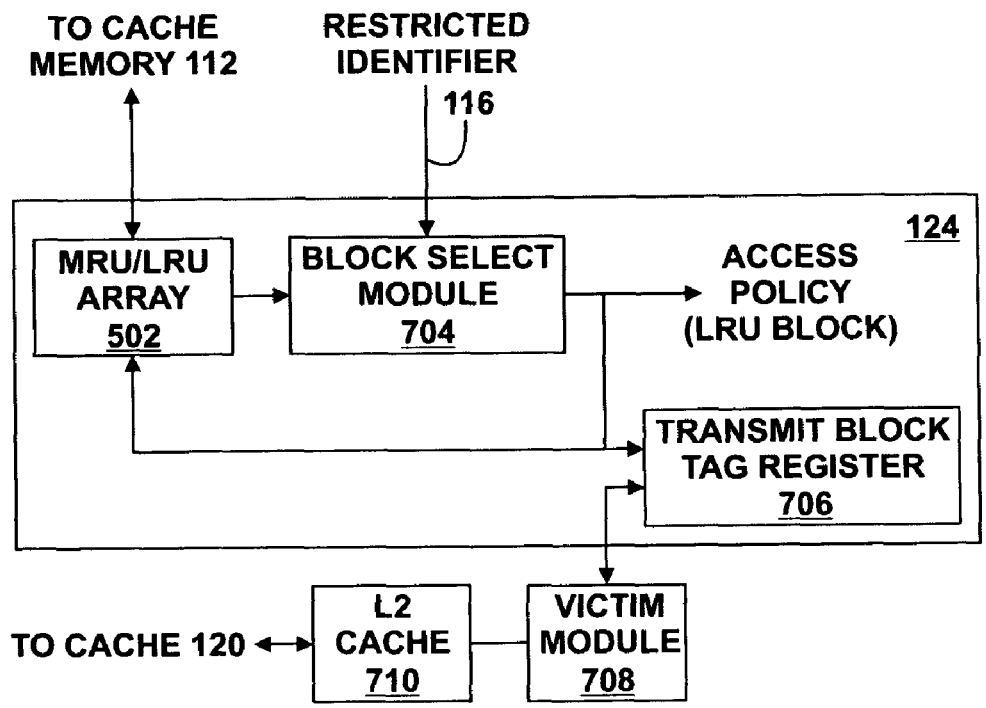
Figure 8:
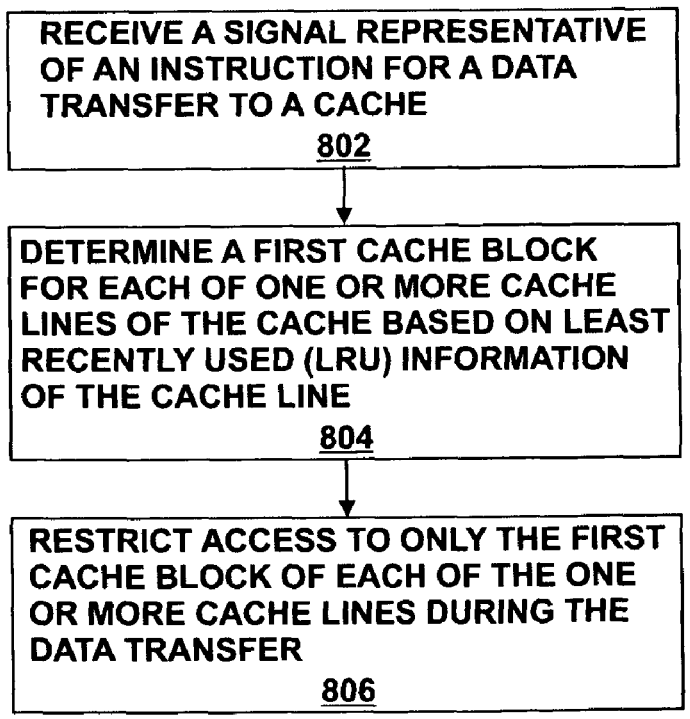

Referring now to FIGS. 7 and 8, another exemplary implementation of the cache control module 124 is illustrated in accordance with at least one embodiment of the present disclosure. In the illustrated example of FIG. 7, the cache control module 124 comprises the most recently used (MRU)/least recently used (LRU) array 502, a block select module 704 and a transient block tag register 706. As discussed above with reference to FIG. 5, the MRU/LRU array 502 is utilized to maintain LRU and/or MRU information about the cache memory 122. The block select module 704, using this information, may identify the least recently used cache line or lines for those cache rows to be used during a data transfer operation. The line select module 704 then may implement an access policy for the cache memory 122 that restricts access to only the identified LRU cache lines of the cache memory 122 during the data transfer operation.

In conventional systems, the transfer of transient data to particular partitions of the various caches results in an update in the MRU/LRU information associated with the cache partitions so as to reflect the writing of the transient data to the particular partitions. As the cache partitions holding this transient data are indicated as MRU data, the cache control logic typically will prevent the overwriting of these cache partitions until they become relatively aged compared to the other cache partitions. However, these cache partitions preferably would be accessible after the data transfer operation is complete as the transferred data was only transient in the cache. Accordingly, in one embodiment, the line select module 704 prevents the MRU/LRU array 502 from being updated during a data transfer operation involving transient data so that the LRU/MRU status of the cache lines used for the data transfer is not updated as a result of their use, or the line select module 704 may modify the MRU/LRU array 502 so that the entries of the array 706 corresponding to the cache lines used in the data transfer are changed to indicate that the cache lines were the least recently used cache lines. As a result, the cache lines used for storing transient data may be available for other operations following the data transfer operation.

It will be appreciated that conventional systems may utilize multiple cache levels whereby data is distributed among multiple caches during a data transfer operation. To illustrate, a processing system may utilize a level one (L1) cache, a level two (L2) cache to facilitate the temporary storage of data for use by a processor. However, after transient data is stored in a higher-level cache during a data transfer operation, the corresponding MRU/LRU information in conventional systems typically indicate that the transient data was most recently used and therefore might cause the overflow of data to a lower-level victim cache. To counter this situation, the line select module 704 further may maintain the transient line tag register 706 to reflect whether the corresponding cache lines of cache memory 122 contain transient data. To illustrate, the register 706 may comprise a one-bit field for each cache line of the cache memory 122. When a particular cache line is used to store transient data, the line select module 704 may write a "1", for example, to the entry of the register 706 corresponding to the particular cache line to indicate that the particular cache line holds transient data.

The transient line tag register 706 then may be utilized in determining whether to spill data over to a victim cache. A victim module 708 associated with a lower-level cache, such as, for example, L2 cache 710, may analyze the register 706 before allowing data to be transferred to the L2 cache 710. In the event that a field of the register 706 associated with a particular cache line has a "1" to indicate that the cache line holds transient data, the victim module 708 directs the cache 120 to store the data in the cache line rather than spilling it over to the L2 cache 710. The victim module 708 then may clear the field of the register 706 by writing a "0" to indicate that the corresponding cache line no longer contains the transient data from the data transfer operation. Thus, when the victim module 708 detects a "0" in the field of the register 706 that corresponds to a particular cache line (thereby indicating that the data in the particular cache line isn't transient data), the victim module 708 may allow data to be spilled over to the L2 cache 710.

The method 800 of FIG. 8 illustrates an exemplary operation using the control module 124 as illustrated in FIG. 7. The method 800 initiates at step 802 wherein a signal representative of an instruction for a data transfer to a cache (e.g., signal 116) is received. At step 804, a first cache line for each of one or more cache rows of the cache is determined based on LRU information of the cache line. At step 806, access is restricted to only the first cache line of each of the one or more cache rows during the data transfer.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving an instruction comprising a prefix field and an opcode field;
   determining a subset of a plurality of ways of a cache based upon the prefix field;
   and storing data associated with the instruction at the cache only within the subset of the plurality of ways of the cache.

2. The method of claim 1, wherein determining the subset of the plurality of ways comprises:
   determining a select cache mask of a plurality of cache masks based upon the prefix field, the select cache mask indicating an accessibility of each of the plurality of ways of the cache.

3. The method of claim 2 wherein determining the select cache mask comprises:
   selecting a first cache mask as the select cache mask when the prefix field matches a first predefined value; and
   selecting a second cache mask as the select cache mask when the prefix field matches a second predefined value.

4. The method of claim 3 wherein determining the select cache mask comprises:
   selecting a first cache mask as the select cache mask when the prefix field indicates the instruction is for a transfer of transient data that is not subject to reuse; and
   selecting a second cache mask as the select cache mask when the prefix field indicates the instruction is for a transfer of data that is subject to reuse, the second cache mask comprising a less restrictive cache mask than the first cache mask.

5. The method of claim 1 wherein the opcode field represents a data transfer instruction.

6. The method of claim 1 wherein the opcode field represents a string move instruction.

7. The method of claim 1 wherein the prefix field represents a repeat-type prefix.

8. The method of claim 1 wherein the prefix field comprises a REPNE prefix.

9. A system comprising:
   a processor to perform a data transfer associated with an instruction comprising a prefix field and an opcode field;
   a cache comprising a plurality of ways; and
   a cache controller to:
      determine a subset of the plurality of ways of the cache based upon the prefix field; and
      store data associated with the data transfer to only the subset of the plurality of ways of the cache.

10. The system of claim 9 wherein the cache controller is to determine the subset of the plurality of ways by determining a select cache mask of a plurality of cache masks based upon the prefix field, the select cache mask indicating an accessibility of each of the plurality of ways of the cache.

11. The system of claim 10 wherein the cache controller is to determine the select cache mask by:
   selecting a first cache mask as the select cache mask when the prefix field matches a first predefined value; and
   selecting a second cache mask as the select cache mask when the prefix field matches a second predefined value.

12. The system of claim 10 wherein the cache controller is to determine the select cache mask by:
   selecting a first cache mask as the select cache mask when the prefix field indicates the instruction is for a transfer of transient data that is not subject to reuse; and
   selecting a second cache mask as the select cache mask when the prefix field indicates the instruction is for a transfer of data that is subject to reuse, the second cache mask comprising a less restrictive cache mask than the first cache mask.

13. The system of claim 9 wherein the opcode field represents a data transfer instruction.

14. The system of claim 9 wherein the opcode field represents a string move instruction.

15. The system of claim 9 wherein the prefix field represents a repeat-type prefix.

16. The system of claim 9 wherein the prefix field is a REPNE prefix.

* * * * *